United States Patent
Cors et al.

(10) Patent No.: US 9,935,824 B2
(45) Date of Patent: Apr. 3, 2018

(54) VIRTUALIZATION OF CONSISTENCY GROUPS

(71) Applicant: International Business Machines Corporation, Armonk, NY (US)

(72) Inventors: Josep Cors, Rochester, MN (US); Naresh Nayar, Rochester, MN (US); Suraj Subramanian, Lafayette, LA (US); Oliver M. Voigt, Pflugerville, TX (US); Gerhard A. Widmayer, Herrenberg (DE)

(73) Assignee: International Business Machines Corporation, Armonk, NY (US)

( * ) Notice: Subject to any disclaimer, the term of this patent is extended or adjusted under 35 U.S.C. 154(b) by 305 days.

(21) Appl. No.: 14/739,062

(22) Filed: Jun. 15, 2015

(65) Prior Publication Data
US 2016/0366016 A1   Dec. 15, 2016

(51) Int. Cl.
| | |
|---|---|
| G06F 15/173 | (2006.01) |
| H04L 12/24 | (2006.01) |
| H04L 29/08 | (2006.01) |
| G06F 3/06 | (2006.01) |

(52) U.S. Cl.
CPC ........... H04L 41/0806 (2013.01); G06F 3/06 (2013.01); H04L 41/0893 (2013.01); H04L 67/1097 (2013.01)

(58) Field of Classification Search
None
See application file for complete search history.

(56) References Cited

U.S. PATENT DOCUMENTS

| | | | |
|---|---|---|---|
| 7,657,782 B2 | 2/2010 | Das et al. | |
| 8,832,399 B1 | 9/2014 | Natanzon et al. | |
| 8,977,593 B1 | 3/2015 | Natanzon et al. | |
| 2010/0257326 A1* | 10/2010 | Otani | G06F 11/1451 711/162 |
| 2011/0153964 A1* | 6/2011 | Browne | G06F 11/2064 711/162 |
| 2013/0067472 A1* | 3/2013 | Laverone | G06F 9/5061 718/1 |
| 2014/0189429 A1* | 7/2014 | Gill | G06F 11/1446 714/19 |
| 2016/0098324 A1* | 4/2016 | Sugabrahmam | G06F 9/50 714/6.23 |

OTHER PUBLICATIONS

"Consistency Groups in a Nutshell"; IBM; Apr. 2007; © 2007 IBM Corporation; pp. 1-2.

(Continued)

*Primary Examiner* — Joshua Joo
(74) *Attorney, Agent, or Firm* — Edward J. Wixted, III

(57) ABSTRACT

In an approach for provisioning a server utilizing a virtual consistency group, a processor receives a request to provision a first server utilizing a first application consistency group, wherein the first application consistency group is a virtualized consistency group. A processor defines a storage consistency group. A processor assigns the first application consistency group to the storage consistency group. A processor provisions the first server. A processor assigns to the provisioned first server, storage specified by the first application consistency group.

18 Claims, 5 Drawing Sheets

(56) References Cited

OTHER PUBLICATIONS

"IBM Cloud Managed Services"; IBM; Printed Jun. 2, 2015; pp. 1-2; <http://www.ibm.com/cloud-computing/us/en/products/ibm-cloud-managed-services.html>.

Mell et al., "The NIST Definition of Cloud Computing" Recommendations of the National Institute of Standards and Technology, U.S. Department of Commerce, Special Publication 800-145, Sep. 2011, 7 pages.

* cited by examiner

VIRTUALIZATION OF CONSISTENCY GROUPS

BACKGROUND

The present invention relates generally to the field of data storage and consistency modeling, and more particularly to virtualization of consistency groups in a cloud environment.

Cloud computing involves application systems which are executed within the cloud and operated through internet enabled devices. Cloud computing is computing in which large groups of remote servers are networked to allow centralized data storage and online access to computer services or resources. Cloud networks can be classified as public, private, or a hybrid of the two. Cloud services within the cloud service are made available to users on demand via the Internet from a cloud computing provider's servers as opposed to being provided from an end user's personal servers. Cloud services are designed to provide easy, scalable access to applications, resources, and servers, and are fully managed by a cloud service provider. A cloud service provider can fluctuate in size based on the needs of its users and the resources of the cloud service provider.

A consistency group is the concept of grouping all system, middleware, and application volumes that are required to be managed, as a consistent entity. Consistency groups enable users to group "related volumes" together representing, for example, a business transaction, that may involve multiple transactions across a single database/file system, or multiple databases/file systems located on a single or multiple heterogeneous server platform.

Current data protection systems try to provide continuous data protection which enable the organization to roll back to any specified point in time within a recent history. Continuous data protection systems aim to minimize the down time in which site data is unavailable during a recover and to enable recovery as close to possible to any specified point in time within a recent history. One challenge to continuous data protection is enabling compatibility and utilizing a consistency group such that workloads can run across processor architectures and hypervisors. Such a problem may arise in a cloud computing environment.

U.S. Pat. No. 8,977,593 B1 is generally within the field of continuous data protection and describes "[a] new virtual [consistency group] CG may be created which may consist of several internal CGs. The virtual CG may be presented to the user and the user may be able to perform all actions on the virtual CG." (U.S. Pat. No. 8,977,593 B1, Col. 3, Lines 19-22).

SUMMARY

Aspects of an embodiment of the present invention disclose a method, computer program product, and computer system for provisioning a server utilizing a virtual consistency group. A processor receives a request to provision a first server utilizing a first application consistency group, wherein the first application consistency group is a virtualized consistency group. A processor defines a storage consistency group. A processor assigns the first application consistency group to the storage consistency group. A processor provisions the first server. A processor assigns to the provisioned first server, storage specified by the first application consistency group.

Embodiments of the present invention disclose an approach to virtualize and automate the exploitation of consistency groups in a cloud environment through the use of defined application consistency groups utilizing storage defined within a storage consistency group.

Additional embodiments of the present invention may disclose that a second server is assigned to a first application consistency group already having an assigned first server. An embodiment in which a second server is assigned to a first application consistency group already having an assigned first server has the advantage of increasing the number of servers that correspond to a single application consistency group, and thus, increasing the scope of data consistency. Additional embodiments of the present invention may disclose that a second application consistency group can be added to a single storage consistency group. An embodiment in which a second application consistency group can be added to a single storage consistency group has the advantage of increasing the flexibility of the system by allowing multiple application consistency groups to be located on a single storage consistency group. Additional embodiments of the present invention may disclose that a first application consistency group includes storage across multiple storage tiers. An embodiment in which the first application consistency group includes storage across multiple storage tiers has the advantage of increasing flexibility of data storage and the ability to meet storage requests specifying varying levels of data protection. Additional embodiments of the present invention may disclose that assigning an application consistency group to a storage consistency group enables unilaterally provisioning computing capabilities. An embodiment in which assigning an application consistency group to a storage consistency group enables unilaterally provisioning computing capabilities has the advantage of enabling the utilization of storage consistency groups in an effective and efficient manner in a cloud environment.

DETAILED DESCRIPTION

Figure 1:
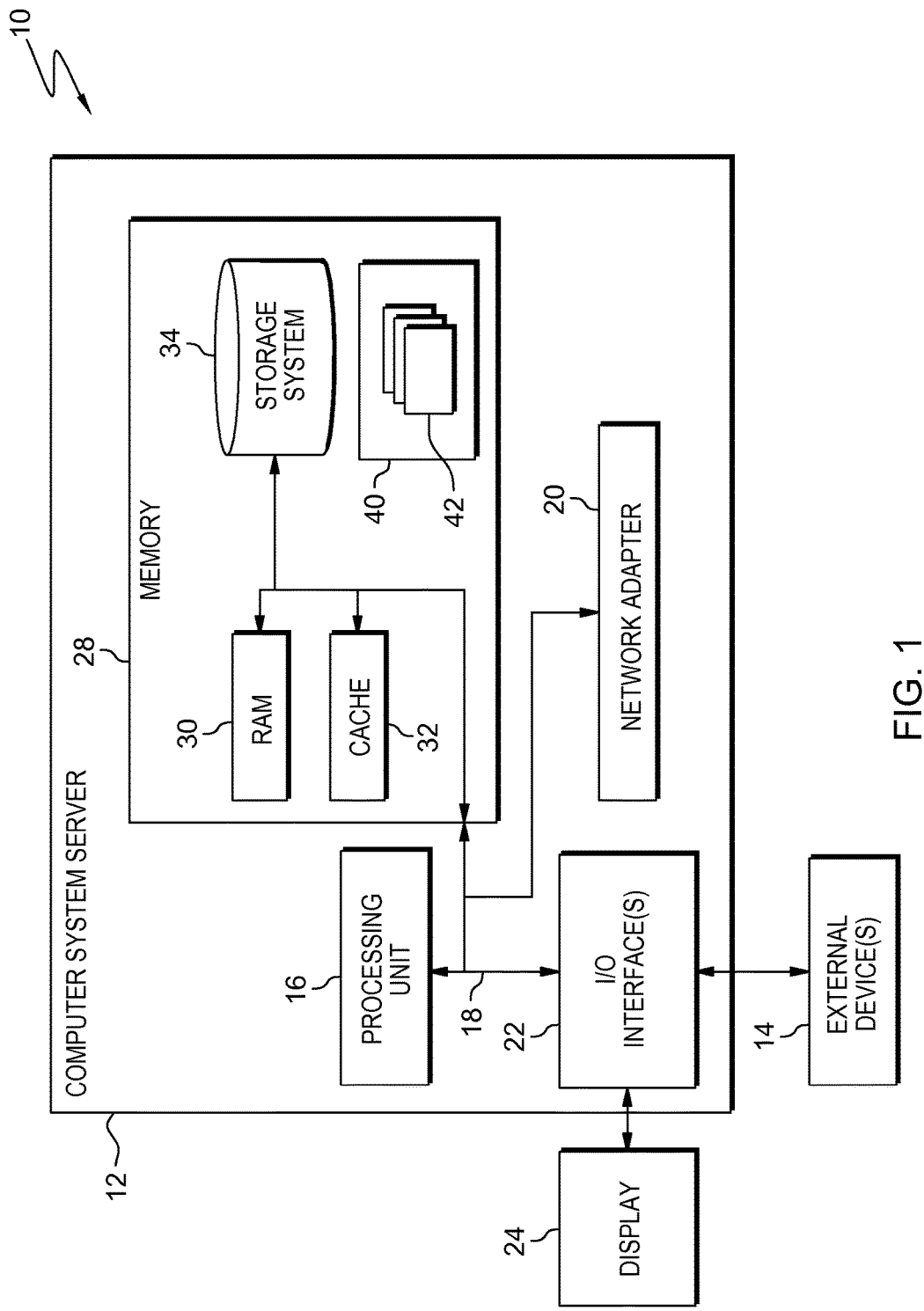
FIG. 1 depicts a cloud computing node according to an embodiment of the present invention.

Embodiments of the present invention recognize that an automated and efficient mechanism is desirable in a cloud environment that includes different processor architectures and hypervisors. Embodiments of the present invention disclose an approach to virtualize and automate the exploitation of consistency groups in a cloud environment through the use of defined application consistency groups utilizing storage defined within a storage consistency group. Embodiments of the present invention recognize that such application consistency groups may simplify the exploitation of consistency groups for autonomous recovery in a cloud environment.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
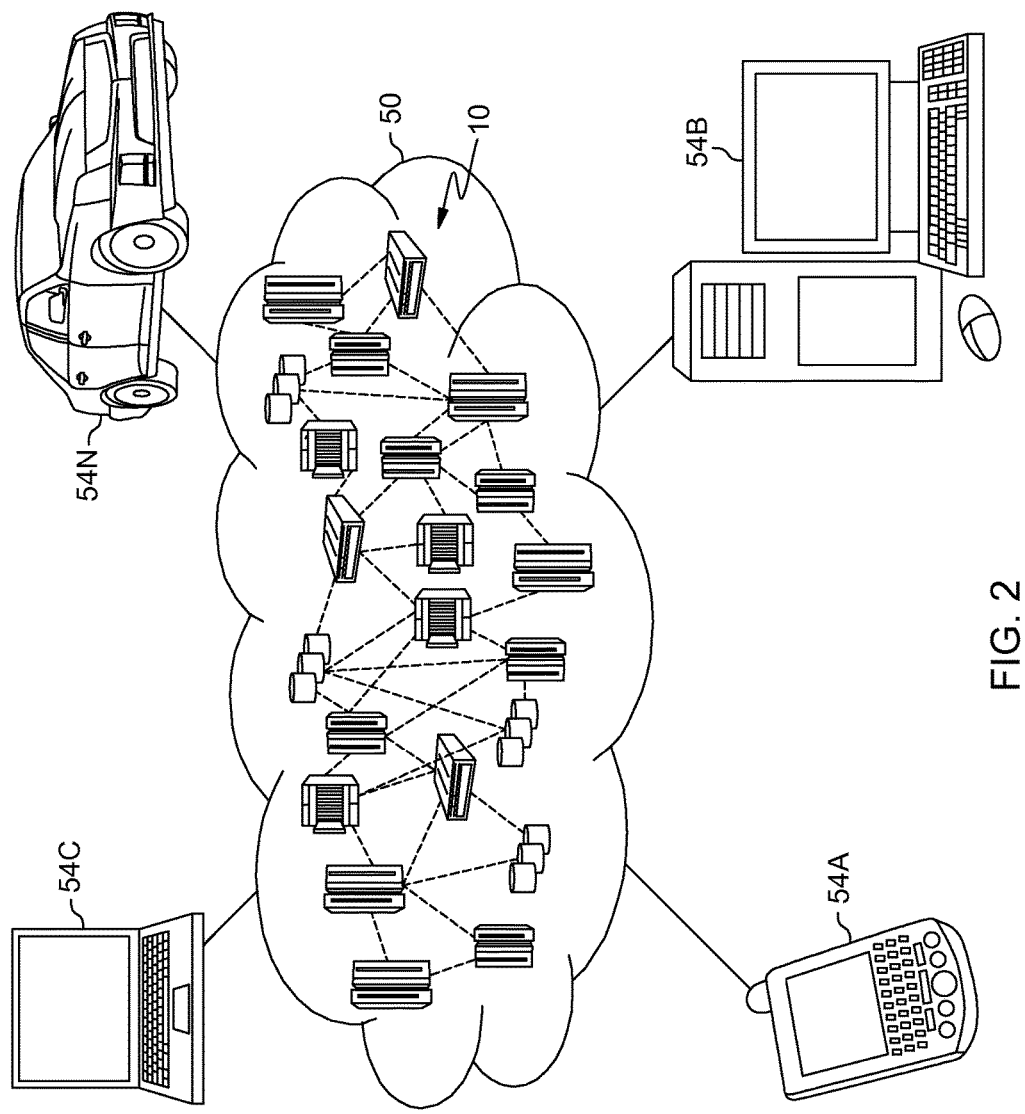
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
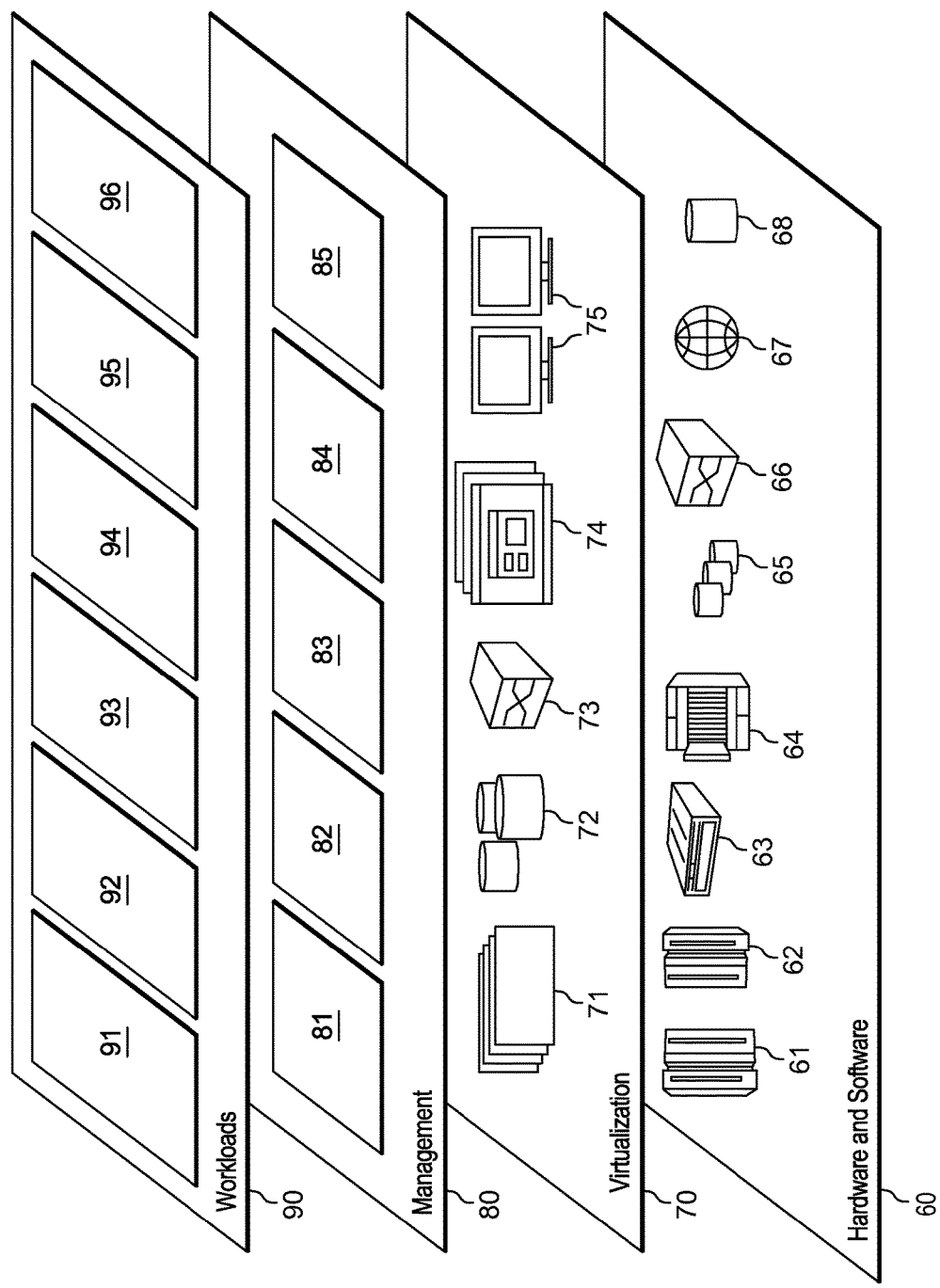
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91;

software development and lifecycle management 92; virtual classroom education delivery 93; data analytics processing 94; transaction processing 95; and mobile desktop 96.

Figure 4:
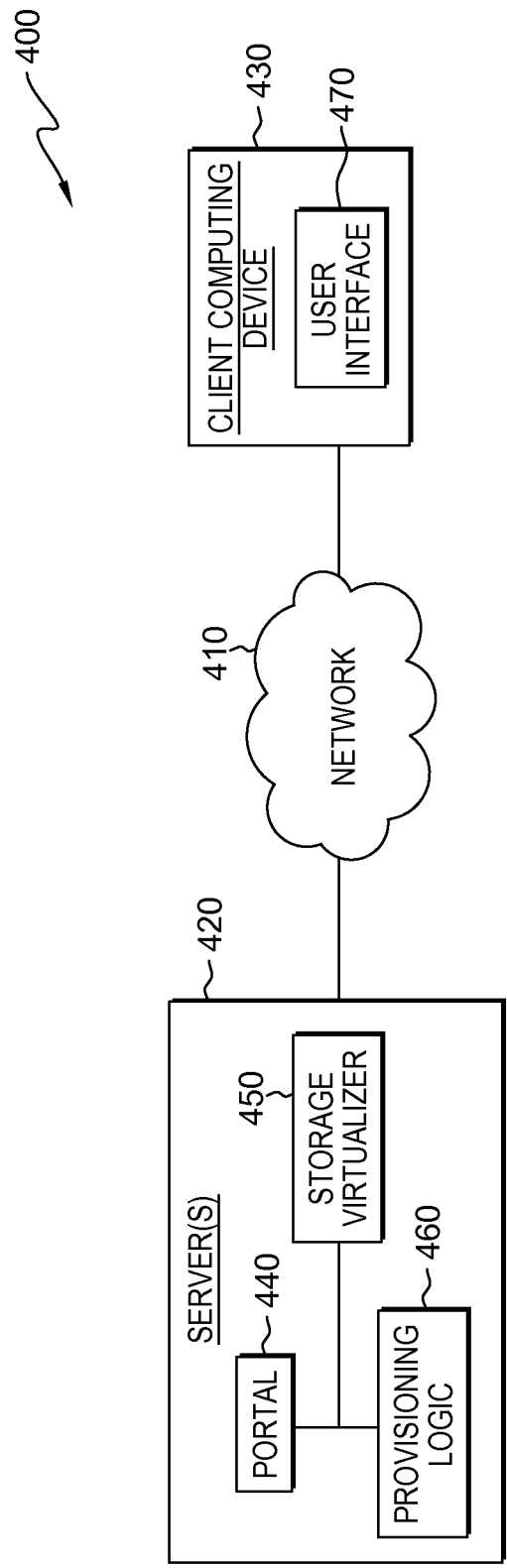
FIG. 4 depicts a diagram of a computing environment according to an embodiment of the present invention.

FIG. 4 depicts a diagram of computing environment 400. Computing environment 400 is a partial depiction of one example of an architecture of cloud computing environment 50, as described in reference to FIG. 2. FIG. 4 provides only an illustration of one embodiment, and does not imply any limitations with regard to the environments in which different embodiments may be implemented.

In the depicted embodiment, computing environment 400 includes server(s) 420 and client computing device 430 interconnected over network 410. Network 410 may be a local area network (LAN), a wide area network (WAN) such as the Internet, any combination thereof, or any combination of connections and protocols that will support communications between server(s) 420 and client computing device 430, in accordance with embodiments of the invention. Computing environment 400 may include additional computing devices, servers, computers, mobile devices, or other devices not shown.

Server(s) 420 may be a management server, a web server, or any other electronic device or computing system capable of receiving and sending data. In some embodiments, server(s) 420 may be a laptop computer, tablet computer, netbook computer, personal computer (PC), a desktop computer, or any programmable electronic device capable of communicating with client computing device 430 via network 410. In one embodiment, server(s) 420 represents a node, such as node 10, of a cloud computing environment, such as cloud computing environment 50 (see FIG. 2). In some embodiments, server(s) 420 may represent a server computing system utilizing multiple computers as a server system, such as in a cloud computing environment. In some embodiments, server(s) 420 represents a computing system utilizing clustered computers and components to act as a single pool of seamless resources. In the depicted embodiment, server(s) 420 contains, at least, portal 440, storage virtualizer 450, and provisioning logic 460.

Client computing device 430 may be a management server, a web server, or any other electronic device or computing system capable of receiving and sending data. In some embodiments, client computing device 430 may be a laptop computer, tablet computer, netbook computer, personal computer (PC), a desktop computer, or any programmable electronic device capable of communicating with server(s) 420 via network 410. In one embodiment, client computer device 430 is one example of a computing device, such as computing devices 54A-54N, used to access and/or communicate with cloud computing environment 50. In some embodiments, client computing device 430 may represent a server computing system utilizing multiple computers as a server system, such as in a cloud computing environment. In some embodiments, client computing device 430 represents a computing system utilizing clustered computers and components to act as a single pool of seamless resources. In the depicted embodiment, client computing device 430 includes user interface 470.

Portal 440 may be, in one embodiment, user portal 83. As described above in reference to user portal 83, portal 440 may provide access to the cloud computing environment for consumers and system administrators. Utilizing portal 440, users can access and create requests, e.g., requests to provision servers (as used herein, "servers" refers to, for example, virtual machines (VMs), bare-metal servers, AIX servers, etc.) with storage specified to be a part of an application consistency group (see below). Portal 440 may connect users to a catalog of resources and services off by the cloud computing environment. In one embodiment, portal 440 resides on server(s) 420. In other embodiments, portal 44 may reside on another computing device, provided portal 440 has access to provisioning logic 460 and is accessible via user interface 470.

Storage virtualizer 450 is a storage virtualization system that, in some embodiments, enables a single point of control for storage resources to help support improved business application availability and greater resource utilization. Storage virtualizer 450 may include many functions traditionally deployed separately in disc systems and includes these functions in a virtualization system. Storage virtualizer 450 can standardize functions across virtualized storage. In general, storage virtualizer 450 provides support for consistency groups, more specifically, storage consistency groups. In one embodiment, storage virtualizer 450 resides on server(s) 420. In other embodiments, storage virtualizer 450 may reside on another computing device, provided storage virtualizer 450 is accessible to provisioning logic 460.

A storage consistency group is a group of system, middleware, and application volumes that are required to be managed as a consistent entity. In general, a storage consistency group is implemented at the infrastructure level, and includes a fixed and predefined size of stored that makes up the storage consistency group. One consistency group can be created across multiple storage tiers. In general, tiered storage refers to the concept of assigning different categories of data to different types of storage media in order to reduce total storage cost. Categories may be based on levels of protection needed, performance requirements, frequency of use, or other considerations. For example, highly important data may be stored on high quality media, such as a redundant array of independent disks (RAID) and rarely accessed, or unimportant data, may be stored on tapes.

Logical unit numbers (LUNs) can be added or removed from the storage consistency group through an interface of storage virtualizer 450. A LUN is a number used to identify a logical unit and may be used with any device which supports read/write operations, such as, for example, a logical disk created on a storage area network (SAN). The term "LUN" may also refer to a logical disk itself. LUNs that are part of a consistency group can be assigned by storage virtualizer 450 to a hypervisor (not shown) as datastores that may be a part of a datastore cluster. A datastore cluster is a collection of datastores with shared resources and a shared management interface. Alternatively, some LUNs that are a part of a consistency group can be assigned to a bare-metal server An application consistency group is a virtualized consistency group that can be exposed to users of a cloud computing environment, as described herein. Application consistency group storage comes from within a defined storage consistency group. However, in some embodiments, multiple application consistency groups may be located within one storage consistency group. A workload utilizing an application consistency group will typically run across multiple VMs and may include, for example, bare-metal servers and AIX servers as a part of the workload. Other types of operating systems may be included as a part of the workload. Each of the multiple servers running the workload can be a part of the same application consistency group. The storage volume for an application consistency group may be created out of a datastore or datastore cluster for a VM, or may be a new LUN created through storage virtualizer 450 interfaces for, for example, a bare-metal server.

Provisioning logic 460 operates to provision servers with storage specified to be a part of an application consistency group. In one embodiment, provisioning logic resides on server(s) 460. In other embodiments, provisioning logic 460 may reside on another computing device, provided provisioning logic 460 is accessible to portal 440, and provided provisioning logic 460 has access to storage virtualizer 450.

User interface 470 operates on client computing device 430 to generate display signals corresponding to content, such as windows, menus, and icons, and to receive various forms of user input. In one embodiment, user interface 470 allows a user at client computing device 470 to access portal 440 via network 410 to provision servers with storage specified to be a part of an application consistency group.

Figure 5:
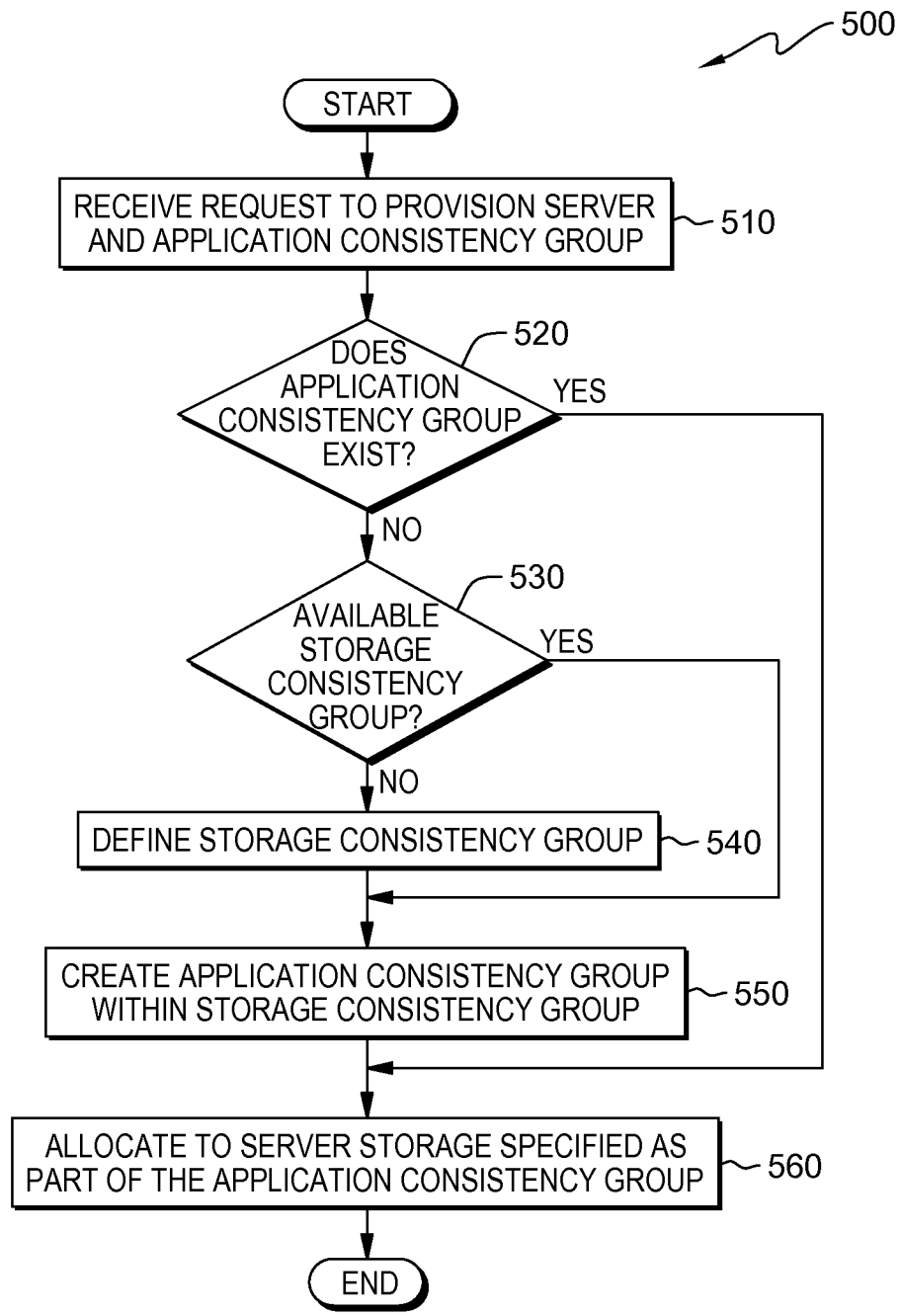
FIG. 5 depicts a flowchart of the steps of a provisioning logic, for provisioning servers with storage specified to be a part of an application consistency group, executing within the computing environment of FIG. 1, in accordance with an embodiment of the present invention.

FIG. 5 depicts flowchart 500 of the steps of provisioning logic 460 executing within computing environment 400 of FIG. 4, in accordance with an embodiment of the present invention. Provisioning logic 460 operates to provision servers with storage specified to be a part of an application consistency group. Such an application consistency group may enable, for example, efficient and effective usage of virtualized consistency groups in a cloud computing environment, and enable consistency groups compatible across processor architectures, hypervisors, and storage tiers.

In step 510, provisioning logic 460 receives a request to provision a server and an application consistency group. In some instances, the application consistency group is a previously existing application consistency group such as, for example, when provisioning additional servers that are to be included within a preexisting application consistency group. In other instances, the application consistency group may be a new application consistency group for a new set of one or more servers being provisioned. As described above, the server may be, for example, a virtual machine, bare-metal server, AIX server, etc. In some embodiments, provisioning logic receives the request from portal 440. Typically, portal 440 received the request via input from a user interface of a client computing device (e.g., user interface 470 of client computing device 430). As described herein, provisioning logic 460 operates to allocate storage specified as part of an application consistency group. However, the additional operations necessary for provisioning of the server may be performed by one or more additional services, programs, or operations managed by cloud computing environment 50, as understood by one skilled in the art.

In decision 520, provisioning logic 460 determines whether the application consistency group exists. As described above, the request may indicate a preexisting or new application consistency group. If provisioning logic 460 determines that the application consistency group is a preexisting group, and thus does exist (decision 520, yes branch), provisioning logic 460 allocates, to the created server, storage specified as a part of the existing application consistency group (see step 560). If provisioning logic 460 determines that there is no preexisting application consistency group, and thus a new application consistency group is necessary (decision 520, yes branch), in some embodiments, provisioning logic 460 determines whether available storage exists within a preexisting storage consistency group (see decision 530).

In decision 530, provisioning logic 460 determines whether available storage exists within a preexisting storage consistency group. As described above, a storage consistency group is fixed and has a predetermined size defined by the infrastructure. Further, and within the infrastructure constraints, one storage consistency group may include multiple application consistency groups. Each application consistency group may be allocated and managed by provisioning logic 460 and/or other resources of management layer 80 (see FIG. 2). In some instances, provisioning logic 460 may identify that a storage consistency group exists, but the necessary amount of storage specified by, for example, request for the application consistency group may be greater than the available storage of the storage consistency group. In other instances, provisioning logic 460 may identify that there are no existing storage consistency groups, and thus, a storage consistency group was not previously been created. As such, provisioning logic 460 may determine that there is no available consistency group. In other instances, provisioning logic 460 may identify that there is a preexisting storage consistency group with the necessary amount of available storage for an additional application consistency group. If provisioning logic 460 determines that there is available storage in an existing storage consistency group (decision 530, yes branch), provisioning logic 460 creates an application consistency group within the existing storage consistency group (see step 550). If provisioning logic 460 determines that there is not available storage in an existing storage consistency group, or alternatively, that there is no existing storage consistency group (decision 530, no branch), provisioning logic 530 defines a new storage consistency group (see step 540).

In step 540, provisioning logic 460 defines a storage consistency group. As defined by provisioning logic 460, the defined storage consistency group will have enough storage to allow provisioning logic 460 to create the application consistency group as per the received request. As described above, a storage consistency group is a grouping of all system, middleware, and application volumes that are required to be managed as a consistent entity. A storage consistency group is defined at the infrastructure level. Storage virtualizer 450 provides support for consistency groups. In some embodiments, provisioning logic 460 causes storage virtualizer 450 to define a storage consistency group using techniques known by one or ordinary skill in the art. In some embodiments, the step of defining a storage consistency group is a manual process, and provisioning logic 460 receives an indication that the storage consistency group has been defined. Storage virtualizer 450 may utilize a variety of data replication techniques to maintain a storage consistency group. For example, a time based consistency group may utilize timestamps on all write I/Os to maintain the consistency group. In another example, storage virtualizer 450 may maintain a consistency group via maintaining the order of all I/Os in a first in, first out (FIFO) manner. In yet another example, storage virtualizer 450 may maintain consistency groups by quiesing, or stopping applications within or across multiple devices when those devices are involved in some form of data replication.

In step 550, provisioning logic 460 creates an application consistency group within the storage consistency group. In some embodiments, such processes are handled by storage virtualizer 450. In some embodiments, a particular application consistency group is designated by the request. Typically, such a request is generated by a user accessing portal 440 via user interface 470 of client computing device 430. As discussed above, all of the storage within the application consistency group is to be storage defined within a single storage consistency group. Provisioning logic 460 may create an application consistency group by creating an entry in a database table maintained by provisioning logic 460. When the first server is created that belongs to the application consistency group, the application consistency group is then associated with a storage consistency group. Subsequent servers that belong to the application consistency group provision storage from the storage consistency group. The application consistency group, as defined, may be compatible with a variety of architectures and hypervisors. In some embodiments, all storage for a server belongs to an application consistency group. In other embodiments, disks or volumes may be tagged, such that disks or volumes belong to different application consistency groups.

In step 560, provisioning logic 460 allocates, to the server specified by the request, storage specified as a part of the application consistency group. Provisioning logic 460 may recognize that the created server is the first server that has specified storage to be part of the application consistency group, and thus, provisioning logic 460 may create the storage volume out of any datastore cluster that is part of a storage consistency group for a virtual machine. Similarly, a new LUN may be created out of a storage consistency group for, for example, a bare-metal server. If provisioning logic 460 is allocating storage from an existing application consistency group for a new server, provisioning logic 460 will select a datastore cluster or LUN that has storage for that application consistency group. In some embodiments, provisioning logic 460 determines the type of storage for the application consistency group to allocate based on, for example, storage tiers, local mirroring, etc.

An embodiment in which assigning an application consistency group to a storage consistency group enables unilaterally provisioning computing capabilities has the advantage of enabling the utilization of storage consistency groups in an effective and efficient manner in a cloud environment. An embodiment in which a second server is assigned to a first application consistency group already having an assigned first server has the advantage of increasing the number of servers that correspond to a single application consistency group, and thus, increasing the scope of data consistency. An embodiment in which a second application consistency group can be added to a single storage consistency group has the advantage of increasing the flexibility of the system by allowing multiple application consistency groups to be located on a single storage consistency group. An embodiment in which the first application consistency group includes storage across multiple storage tiers has the advantage of increasing flexibility of data storage and the ability to meet storage requests specifying varying levels of data protection.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for provisioning a server utilizing a virtual consistency group, the method comprising:
   receiving a request to provision a first server utilizing a first application consistency group, wherein the first application consistency group is a virtualized consistency group;
   defining, by one or more processors, a storage consistency group;
   assigning, by one or more processors, the first application consistency group to the storage consistency group;
   provisioning, by one or more processors, the first server; and
   assigning, by one or more processors, to the provisioned first server, storage specified by the first application consistency group.

2. The method of claim 1, further comprising:
   receiving a request to provision a second server utilizing the first application consistency group;
   provisioning, by one or more processors, the second server; and
   assigning, by one or more processors, to the provisioned second server, storage specified by the first application consistency group.

3. The method of claim 1, further comprising:
   receiving a request to provision a second server utilizing a second application consistency group;
   determining, by one or more processors, the storage consistency group has available storage for the second application consistency group;
   assigning, by one or more processors, the second application consistency group to the storage consistency group;
   provisioning, by one or more processors, the second server; and
   assigning, by one or more processors, to the provisioned second server, storage specified by the second application consistency group.

4. The method of claim 1, wherein the first server is selected from the group consisting of a virtual machine and a bare-metal server.

5. The method of claim 1, wherein the first application consistency group includes storage across multiple storage tiers.

6. The method of claim 1, wherein the step of defining a storage consistency group is supported by a storage virtualizer.

7. A computer program product for provisioning a server utilizing a virtual consistency group, the computer program product comprising:
   one or more computer readable storage media and program instructions stored on the one or more computer readable storage media, the program instructions comprising:
   program instructions to receive a request to provision a first server utilizing a first application consistency group, wherein the first application consistency group is a virtualized consistency group;
   program instructions to define a storage consistency group;
   program instructions to assign the first application consistency group to the storage consistency group;
   program instructions to provision the first server; and
   program instructions to assign to the provisioned first server, storage specified by the first application consistency group.

8. The computer program product of claim 7, further comprising:
   program instructions, stored on the one or more computer readable storage media, to receive a request to provision a second server utilizing the first application consistency group;
   program instructions, stored on the one or more computer readable storage media, to provision the second server; and program instructions, stored on the one or more computer readable storage media, to assign to the provisioned second server, storage specified by the first application consistency group.

9. The computer program product of claim 7, further comprising:
program instructions, stored on the one or more computer readable storage media, to receive a request to provision a second server utilizing a second application consistency group;
program instructions, stored on the one or more computer readable storage media, to determine the storage consistency group has available storage for the second application consistency group;
program instructions, stored on the one or more computer readable storage media, to assign the second application consistency group to the storage consistency group;
program instructions, stored on the one or more computer readable storage media, to provision the second server; and
program instructions, stored on the one or more computer readable storage media, to assign to the provisioned second server, storage specified by the second application consistency group.

10. The computer program product of claim 7, wherein the first server is selected from the group consisting of a virtual machine and a bare-metal server.

11. The computer program product of claim 7, wherein the first application consistency group includes storage across multiple storage tiers.

12. The computer program product of claim 7, wherein program instructions to define a storage consistency group are supported by a storage virtualizer.

13. A computer system for provisioning a server utilizing a virtual consistency group, the computer system comprising:
one or more computer processors, one or more computer readable storage media, and program instructions stored on the one or more computer readable storage media for execution by at least one of the one or more processors, the program instructions comprising:
program instructions to receive a request to provision a first server utilizing a first application consistency group, wherein the first application consistency group is a virtualized consistency group;
program instructions to define a storage consistency group;
program instructions to assign the first application consistency group to the storage consistency group;
program instructions to provision the first server; and
program instructions to assign to the provisioned first server, storage specified by the first application consistency group.

14. The computer system of claim 13, further comprising:
program instructions, stored on the one or more computer readable storage media, to receive a request to provision a second server utilizing the first application consistency group;
program instructions, stored on the one or more computer readable storage media, to provision the second server; and
program instructions, stored on the one or more computer readable storage media, to assign to the provisioned second server, storage specified by the first application consistency group.

15. The computer system of claim 13, further comprising:
program instructions, stored on the one or more computer readable storage media, to receive a request to provision a second server utilizing a second application consistency group;
program instructions, stored on the one or more computer readable storage media, to determine the storage consistency group has available storage for the second application consistency group;
program instructions, stored on the one or more computer readable storage media, to assign the second application consistency group to the storage consistency group;
program instructions, stored on the one or more computer readable storage media, to provision the second server; and
program instructions, stored on the one or more computer readable storage media, to assign to the provisioned second server, storage specified by the second application consistency group.

16. The computer system of claim 13, wherein the first server is selected from the group consisting of a virtual machine and a bare-metal server.

17. The computer system of claim 13, wherein the first application consistency group includes storage across multiple storage tiers.

18. The computer system of claim 13, wherein program instructions to define a storage consistency group are supported by a storage virtualizer.

* * * * *